United States Patent Office 2,807,281
Patented Sept. 24, 1957

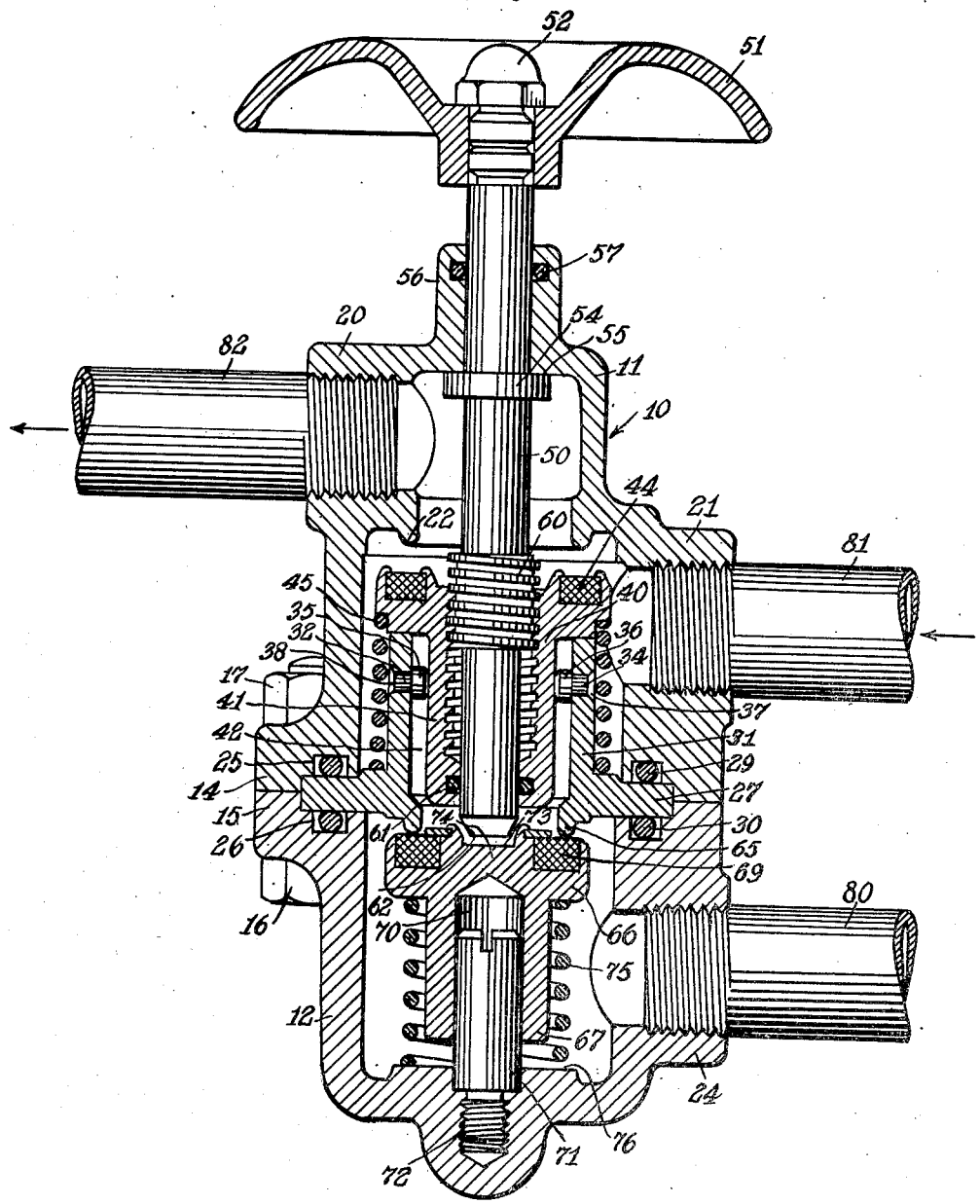

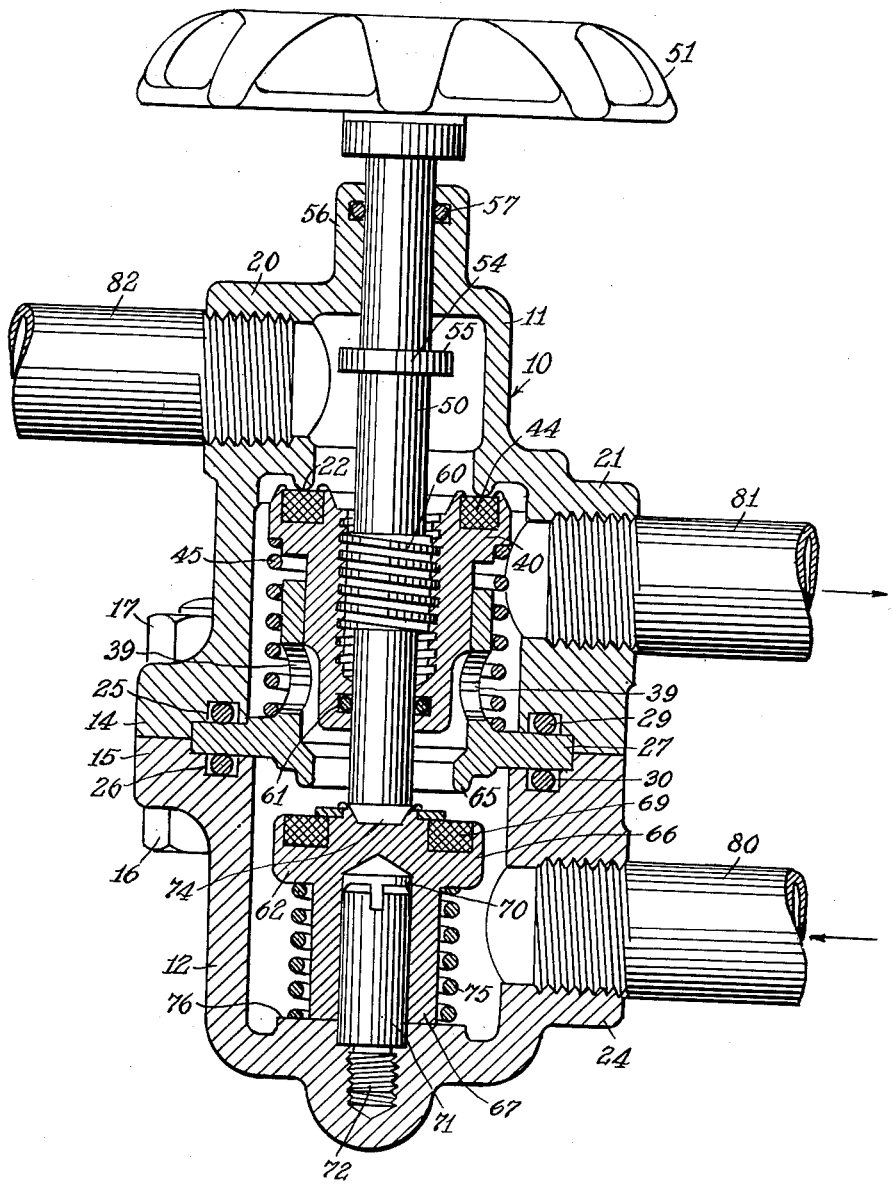

2,807,281

MULTIPLE VALVE

Frank B. Allen, Towaco, and Walter M. Haessler, Chatham, N. J., assignors, by mesne assignments, to The Fyr-Fyter Company, Dayton, Ohio, a corporation of Ohio Application September 16, 1952, Serial No. 309,857

4 Claims. (Cl. 137—627.5)

The present invention relates to valves, and particularly to a multiple valve for connecting one system with another system.

In smoke detection systems such as may be used for ships, warehouses, or similar hazards, it is customary to provide a central smoke detecting apparatus with a system of piping leading from separated locations. Suction apparatus at the smoke detector is used to draw samples of air to be tested for smoke through the piping from the various locations. A fire extinguishing system is centrally located and connected to the piping of the smoke detection system by three-way valves to utilize the same piping for both systems. It is important that the piping to the smoke detector be closed before the piping to the hazard is opened to the fire extinguishing system so that there will be no waste of the fire extinguishing fluid nor possible damage to the delicate detecting equipment by the extinguishing fluid.

An object of the present invention is to provide a multiple valve which is simple and economical in manufacture, efficient in operation and durable in use.

Other objects and advantages of the invention will be apparent from the following description and from the accompanying drawings which show, by way of example, an embodiment of the invention.

In the drawings:

Figure 1 is a vertical sectional view of a valve in accordance with the invention, the valve members shown in the position to permit fluid flow between the upper two connections.

Figure 2 is a view corresponding to Figure 1, but with the valve members shown in the position to permit fluid flow between the lower two connections.

Referring to the drawings, there is shown in Figure 1 a valve 10 in accordance with the invention. The valve includes a body in separable upper and lower portions 11 and 12 respectively, having apertured flanges 14 and 15 to receive bolts 16 engaged by nuts 17 to secure the upper and lower portions together.

The upper portion 11 is formed with bosses 20 and 21 forming two ports as for an inlet and an outlet; a valve seat 22 is positioned between the ports. The lower portion 12 is formed with a boss 24 providing a port as for another inlet.

At the intersection of the upper and lower portions a recess 25 is formed in the upper portion 11 while a cooperating recess 26 is formed in the lower portion 12. A partition member 27 is received in the recess, a leak-proof joint being provided by gaskets 29 and 30. The partition member 27 has an upwardly turned extension 31 apertured to receive guiding members 32 and 34 which may be made with enlarged heads 35 and 36 and secured in position by peening over their smaller ends as indicated at 37 and 38. Outlet ports 39 are formed in the extension 31 (Fig. 2). A valve member 40 is made with a depending portion 41 adapted to be received in the upwardly turned extension 31 of the partition member. The outer surface of the depending portion 41 of the valve member is made with grooves 42 or equivalent construction to engage the heads 35 and 36 of the guiding members 32 and 34 so as to prevent the rotation of the valve member 40 with respect to the body. The valve member 40 is made with a recess on its upper surface to receive a suitable packing material 44 adapted to engage the valve seat 22 to provide a good seal. A spring 45 has one end abutting against the partition member 27 and its other end abutting on the underside of the valve member 40 tending to urge the valve member against its seat. The spring 45 may be omitted if desired, its purpose being to hold the valve member against backlash.

The valve stem 50 extends through the upper portion 11 of the body member. The stem 50 is made with an upper end of reduced section to receive a conventional hand wheel 51 secured in position by a nut 52. The valve stem has an enlarged shoulder 54 to engage a flattened inner surface 55 of the upper portion 11 of the housing member. The housing member is extended upwardly as is indicated at 56 to provide a good bearing surface for the valve stem 50, an O-ring gasket 57 being positioned about the valve stem 50 in the extension 56 to provide a tight seal. The lower end of the valve stem 50 is threaded as indicated at 60 to engage with a corresponding threaded inner surface of the valve member 40. An O-ring seal 61 is provided in the lower end of the depending portion 41 of the valve member 40 so as to provide a tight seal between the valve member and the valve stem. The lower end of the valve stem 50 is bevelled as indicated at 62.

A valve seat 65 is formed on the lower side of the partition member 27 for engagement by a second valve member 66 which also has a depending portion 67 and is also recessed at the upper end thereof to receive a packing 69 so as to provide a good seal with the valve seat 65. The depending portion 67 of the valve member 69 is recessed as indicated at 70 to receive a guiding stud 71 having its lower end 72 threadedly engaged in a recess in the lower portion 12 of the body member. The upper portion of the valve 67 is enlarged as indicated at 74 forming a shoulder against which abuts one end of a spring 75, the other end thereof abutting against a surface 76 on the inner wall of the lower housing portion 12. The upper end of the valve member 69 is recessed as indicated at 78 to receive the bevelled end 62 of the operating stem 50. In the port 24 is shown threadedly engaged a pipe end 80 which may be connected to a source of fire extinguishing fluid. In the port 21 is threadedly engaged a pipe 81 which may lead to a location desired to be protected against fire, while in the port 20 is shown threadedly engaged a pipe 82 which may lead to a smoke detector. In using a valve of this type in a combination smoke detecting and fire extinguishing system, it is important that the piping be closed from the smoke detector before the fire extinguishing fluid is admitted.

In the operation of the valve 10 it will be seen that in Figure 1 the valve member 66 is in port closing position with the valve seat 65 so as to close off the fire extinguishing fluid in the pipe 80. The valve member 40 is spaced from its seat 22 so as to provide fluid communication from the pipe 81 leading from a hazard to the pipe 82 connected to a smoke detector drawing samples of air from the hazard. It should be noted that the valve stem 50 has its collar 54 positioned against the surface 55. This is due to the fact that the valve stem has been turned so that its threaded surface 60 has engaged the corresponding threaded surface on the inner side of the valve member 40 thereby unseating the valve member 40 against the action of the spring 45. Upon the rotation of the valve stem 50 in the opposite direction the threaded surface 60 has allowed the valve member 40, under the action of the spring 45, to engage its seat 22 as may be seen in Figure 2. Upon further turning of the valve stem 50 by the wheel 51, the threaded surface 60 has moved downwardly by reason of the fact that the valve member 40 has engaged its seat 22. The bevelled end 62 of the operating stem 50 has engaged in the recess 78 of the lower valve member 69, thereby unseating the valve member against the action of its spring 75 and, thus, providing fluid communication from the pipe 80 past the valve seat 69 through the ports 39 and thence out through the pipe 81 to the hazard to be protected.

From the foregoing description it will be seen that a simple and economical construction has been provided in which the first valve member of a multiple valve is moved to the closed position before the second valve member has been moved into an open position.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

We claim:

1. A smoke detector system multiple valve comprising a body including separable upper and lower members forming an enclosed space, means to secure the separable body members together, a valve stem extending from the upper body member and having a threaded inner portion, a partition member having a passage therethrough and secured in position by engagement of its edge between the upper and lower body members, the partition member dividing the enclosed space of the body member into a main valve chamber and an inlet chamber, an outlet port for the main valve chamber, a valve seat for the outlet port, an outlet valve member adapted to engage the outlet port valve seat, the outlet valve member having a threaded opening therethrough for engagement with the threaded portion of the valve stem, means engaging the partition member and preventing the rotation of the outlet valve member with respect to the body, an inlet valve seat in the inlet chamber about the passage in the partition member, an inlet valve guiding stud fixedly positioned within the enclosed space and extending upwardly an inlet valve adapted to engage the inlet valve seat and positioned at the end of the valve stem and having a hollow opening in the bottom thereof for sliding engagement with the guiding stud, and a port for the main valve chamber, whereby upon the rotation of the valve stem in one direction the outlet valve member is first moved into outlet port closing position and the inlet valve member is then moved into inlet port opening position and upon the rotation of the valve stem in the opposite direction the inlet valve member is first moved into inlet port closing position and then the outlet valve member is moved into outlet port opening position, the main valve chamber port thereby in fluid communication with either the inlet or outlet ports depending upon whether the inlet or outlet valve member is in the open position.

2. A smoke detector system multiple valve comprising a body including separable upper and lower members forming an enclosed space, means to secure the separable body members together, a valve stem extending from the upper body member and having a threaded inner portion, a partition member having a passage therethrough and secured in position by engagement of its edge between the upper and lower body members, the partition member dividing the body member into a main valve chamber and an inlet chamber, an outlet port for the main valve chamber, a valve seat for the outlet port, an outlet valve member adapted to engage the outlet port valve seat, the outlet valve member having a threaded opening therethrough for engagement with the threaded portion of the valve stem, an upwardly turned extension for the partition member, guiding means in the extension preventing the rotation of the outlet valve member with respect to the body, an inlet valve seat in the inlet chamber about the passage in the partition member, an inlet valve guiding stud fixedly positioned within the enclosed space and extending upwardly an inlet valve adapted to engage the inlet valve seat and positioned at the end of the valve stem, the inlet valve having a hollow opening in the bottom thereof for sliding engagement with the guiding stud, means yieldingly urging the inlet valve member towards the inlet valve seat, and a port for the main valve chamber, whereby upon the rotation of the valve stem in one direction the outlet valve member is first moved into outlet port closing position and the inlet valve member is then moved into inlet port opening position and upon the rotation of the valve stem in the opposite direction the inlet valve member is first moved into inlet port closing position and then the outlet valve member is moved into outlet port opening position, the main valve chamber port thereby in fluid communication with either the inlet or outlet ports depending upon whether the inlet or outlet valve member is in the open position.

3. A smoke detector system multiple valve comprising a body in separable portions, a valve stem extending from the body and having a threaded inner portion, a partition member having a passage therethrough and positioned in the body member by contact between adjacent edges of the separable portions, the partition member dividing the body member into a main valve chamber and an inlet chamber, an outlet port for the main valve chamber, a valve seat for the outlet port, an outlet valve member adapted to engage the outlet port valve seat, the outlet valve member having a threaded opening therethrough for engagement with the threaded portion of the valve stem, means preventing the rotation of the outlet valve member with respect to the body, an inlet valve seat in the inlet chamber about the passage in the partition member, an inlet valve adapted to engage the inlet valve seat and positioned at the end of the valve stem, and a port for the main valve chamber, whereby upon the rotation of the valve stem in one direction the outlet valve member is first moved into outlet port closing position and the inlet valve member is then moved into inlet port opening position and upon the rotation of the valve stem in the opposite direction the inlet valve member is first moved into inlet port closing position and then the outlet valve member is moved into outlet port opening position, the main valve chamber port thereby in fluid communication with either the inlet or outlet ports depending upon whether the inlet or outlet valve member is in the open position.

4. A smoke detector system multiple valve comprising a body in separable portions, a valve stem extending from the body and having a threaded inner portion, a partition member having a passage therethrough and positioned in the body member by contact between adjacent edges of the separable portions, the partition member dividing the body member into a main valve chamber and an inlet chamber, an outlet port for the main valve chamber, a valve seat for the outlet port, an outlet valve member adapted to engage the outlet port valve seat, the outlet valve member having a threaded opening therethrough for engagement with the threaded portion of the valve stem, an upwardly turned extension for the partition member, guiding means in the extension preventing the rotation of the outlet valve member with respect to the body, an inlet valve seat in the inlet chamber about the passage in the partition member, an inlet valve adapted to engage the inlet valve seat and positioned at the end of the valve stem, means yieldingly urging the inlet valve member towards the inlet valve seat, and a port for the main valve chamber, whereby upon the rotation of the valve stem in one direction the outlet valve member is first moved into outlet port closing position and the inlet valve member is then moved into inlet port opening position and upon the rotation of the valve stem in the opposite direction the inlet valve member is first moved into inlet port closing position and then the outlet valve member is moved into outlet port opening position, the main valve chamber port thereby in fluid communication with either the inlet or outlet ports depending upon whether the inlet or outlet valve member is in the open position.

References Cited in the file of this patent

UNITED STATES PATENTS

| | | |
|---|---|---|
| 909,989 | Charmois | Jan. 19, 1909 |
| 1,127,552 | Walker | Feb. 9, 1915 |
| 1,966,567 | Stoner | July 17, 1934 |
| 2,206,215 | Allison | July 2, 1940 |
| 2,301,276 | Gussick | Nov. 10, 1942 |
| 2,327,942 | Thoresen | Aug. 24, 1943 |
| 2,661,765 | Troy | Dec. 8, 1953 |

FOREIGN PATENTS

| | | |
|---|---|---|
| 409,683 | Great Britain | of 1934 |